T. I. DUFFY.
INSTRUMENT DIAL.
APPLICATION FILED MAY 14, 1917.
1,320,383.
Patented Nov. 4, 1919.
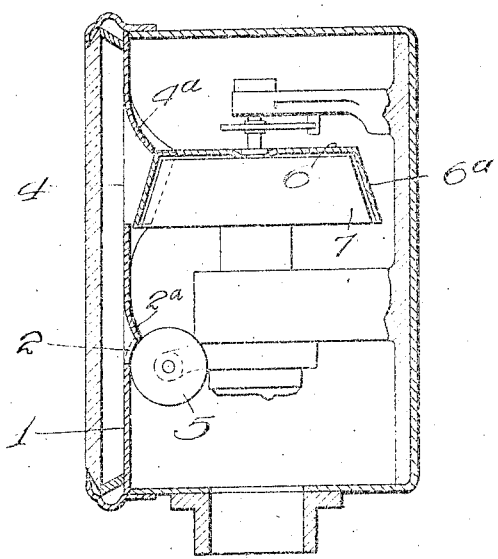
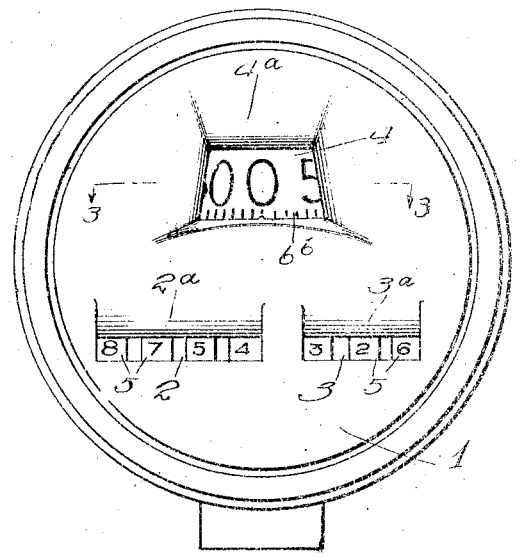
Inventor
Thomas I. Duffy
by Burton & Burton
his Attorneys
Witness:

UNITED STATES PATENT OFFICE.

THOMAS I. DUFFY, OF CHICAGO, ILLINOIS, ASSIGNOR TO STEWART-WARNER SPEEDOMETER CORPORATION, OF CHICAGO, ILLINOIS, A CORPORATION OF VIRGINIA.

INSTRUMENT-DIAL.

1,320,383.   Specification of Letters Patent.   Patented Nov. 4, 1919.

Application filed May 14, 1917. Serial No. 168,573.

*To all whom it may concern:*

Be it known that I, THOMAS I. DUFFY, a citizen of the United States, residing at Chicago, in the county of Cook and the State of Illinois, have invented certain new and useful Improvements in Instrument-Dials, of which the following is a specification, reference being had to the accompanying drawings, forming a part thereof.

This invention relates to improvements in dial plates and indicating members of various types of meters and registers for increasing their legibility. The invention is herein shown as applied to a combined speedometer and odometer and consists in certain features of construction and their combinations herein described and shown in the drawings as indicated by the claims.

In the drawings:—

Figure 1 is a vertical sectional view of a combined speedometer and odometer provided with indicating members and a dial plate embodying this invention.

Fig. 2 is a front elevation of the instrument shown in Fig. 1.

Fig. 3 is a detail section taken as indicated at line 3—3, on Fig. 2.

In many forms of meters and registers in which the indication is by means of a movable scale or indicating member of which a limited portion is rendered visible through a window in the dial plate of the instrument, it is frequently desirable to mount the instrument so that the dial plate is substantially in a vertical plane. In a speedometer or odometer of this general type, it is also desirable that the actuating shaft shall emerge from the casing substantially parallel to the plane of the dial plate so that the flexible driving shaft through which it is connected to the propeller shaft or to the road wheel of the vehicle may trend directly downward from the instrument without the use of bevel or spiral gears. These results are obtained when an instrument of this type is carried in or on a substantially vertical instrument board in the vehicle body, but such boards are generally positioned some distance below the eye of the driver so that if the scale-bearing or numeral-bearing indicating member is so arranged that its surface appearing at the window of the dial plate is substantially vertical, the driver is forced to view the indicating member at a disadvantage because his line of sight is oblique to its surface.

In the present construction as indicated in Fig. 1, the substantially vertical dial plate, 1, is provided with windows, 2 and 3, for the odometer, and with a window, 4, for the speedometer. The odometer scale marks which consist simply in a series of numerals on each of the counter wheels, 5, are carried on the cylindrical surfaces of these wheels, and the windows, 2 and 3, instead of having their horizontal center line approximately in the horizontal plane of the axis of the counter wheels, 5, are positioned considerably above this axis so as to render visible a certain limited area of the wheel surfaces which extend obliquely with respect to the general plane of the dial plate, 1, and diverge upwardly therefrom. Thus when the instrument is mounted with the dial plate, 1, substantially vertical and the odometer figures on the wheel, 5, are viewed from a point considerably above the instrument, the line of sight to the figures will strike the visible surfaces of the dial wheels, 5, more nearly at right angles, giving the maximum of legibility to the figures.

To secure a similar effect with the speedometer scale which is carried on the skirt, 6ª, of the drag member, 6, mounted to rotate on a vertical axis and actuated in a well understood manner by means of a magnet, 7, co-axial with it, the skirt, 6ª, is formed flaring downwardly so as to constitute transverse section of a cone, and so that the portion of its surface which is visible at the window, 4, will extend obliquely with respect to the dial plate, 1, diverging upwardly therefrom. In addition to carrying a series of speed-indicating numerals, the skirt, 6ª, is usually provided with an equal part scale, and when formed as shown in Fig. 1, it will be evident that the scale mark, 6ᵇ, will converge slightly toward the apex of the cone, of which the skirt, 6ª, is a portion. In conformity with this style, the lateral margins of the window, 4, may also be made to slant at a corresponding angle, as seen in Fig. 2.

With the visible surface of the wheels, 5, and drag cup, 6, inclined as to the dial plate, 1, as shown, it will be evident that if the windows, 2, 3 and 4, were merely cut in a perfectly flat dial plate, their upper margins would tend to obstruct the view of the upper portion of the indicating members. Therefore the plate, 1, is preferably formed with its area adjacent the windows, 2, 3 and 4, depressed toward the indicating members, so as to bring the entire margin of each window close to the member which it reveals. These depressions in the plate, 1, are indicated in the drawings at 2ª, 3ª and 4ª, respectively.

I claim:

1. In combination with an instrument dial plate, a movable indicating member behind the dial plate, whose surface containing the indicating characters travels at the part of its path at which it is to be observed, in a direction oblique to the plane of the dial, the dial plate having a sight aperture whose medial longitudinal line is in a plane substantially at right angles to said oblique direction of travel of the indicating surface, the margin of said aperture being deflected back of the plane of the dial plate past the plane at said right-angled position, into approximation to the indicating surface by so defining the area of said surface to be read.

2. In a construction such as defined in claim 1 foregoing, the movable indicating member being a cylinder with its axis horizontal and parallel to the flat dial.

In testimony whereof I have hereunto set my hand this 10th day of May, 1917.

THOMAS I. DUFFY.